Sept. 28, 1943.     A. J. DI LUCCI     2,330,475
PISTON RING EXPANDER
Filed April 1, 1940
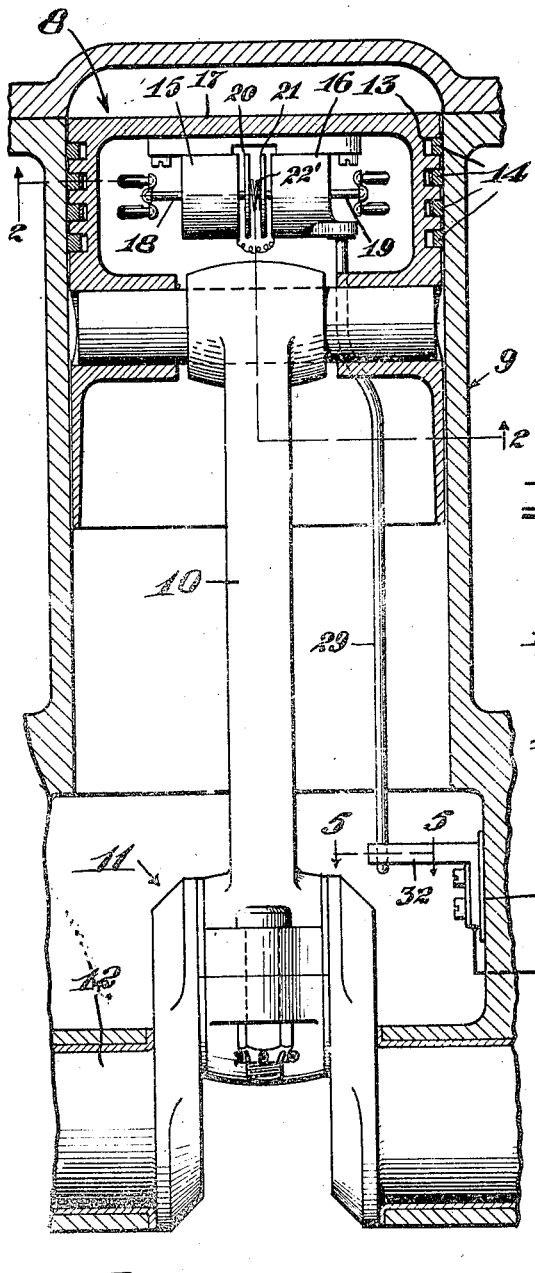
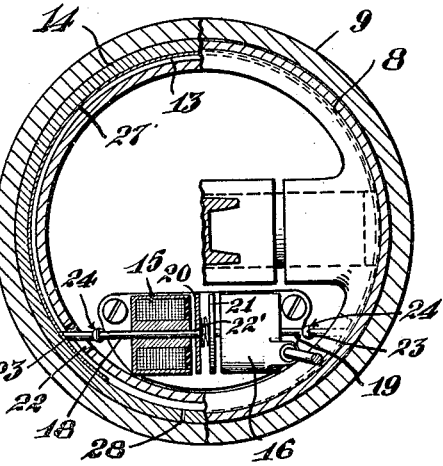
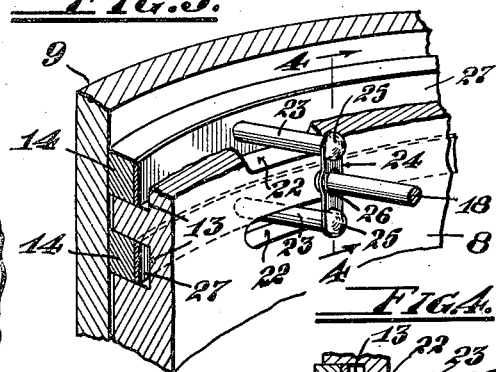
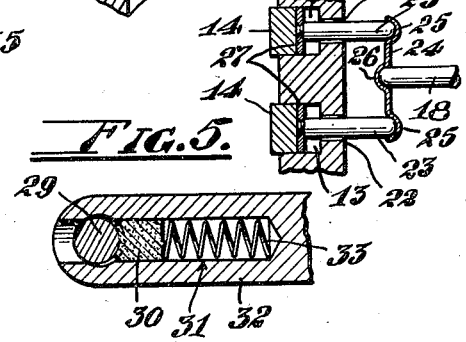
Inventor
Anthony J. DiLucci:
By
Attorney Patented Sept. 28, 1943

2,330,475

UNITED STATES PATENT OFFICE 2,330,475

PISTON RING EXPANDER

Anthony J. Di Lucci, Los Angeles, Calif., assignor to Sydney J. Levy, Los Angeles, Calif.

Application April 1, 1940, Serial No. 327,230

6 Claims. (Cl. 309—35)

This invention relates to an engine piston and more particularly pertains to pistons of the type employed in internal combustion engines which are equipped with a series of circumferential grooves fitted with expansible rings that are designed to slidably engage the walls of the engine cylinder.

An object of the invention is to provide an efficient means for maintaining a piston ring in close contact with the cylinder wall of an engine and to compensate for wear of the ring and to some extent compensate for wear of the cylinder wall as where the latter wears out of round, so as to minimize leakage of oil and gases past the piston ring during the operation of the engine.

Another object is to provide a means for the purpose above stated embodying a magnet as a source of energy for effecting expansion of the piston ring.

Another object is to provide a construction whereby an electro-magnet may be employed as the ring expansive element.

Another object is to provide regulating means whereby the force exerted in effecting expansion of the piston ring may be controlled and varied at will during operation of the piston as occasion may require.

Another object is to provide a piston ring expansion means of the above character which is adapted to be applied to a plurality of rings on a piston, and in which means are provided for equalizing the expansive action on the different rings relative to each other.

A further object is to provide a piston ring expansive means which is operable through the bottom wall of the ring groove of a piston in a fashion to effect an extended distribution of expansion force along the inner periphery of the ring from a localized point of application of such force.

With the foregoing objects in view, together with such other objects and advantages as may subsequently appear, the invention is carried into effect as illustrated by way of example in the accompanying drawing, in which:

Fig. 1 is a view in vertical section partly in elevation of an engine piston and its cylinder showing the invention as applied;

Fig. 2 is a view in cross section taken on the line 2—2 of Fig. 1;

Fig. 3 is a perspective view of a fragmentary portion of a piston and rings thereof in association with a cylinder, depicting the mode of equalizing application of expansive forces to a pair of piston rings, and also showing the manner of effecting distribution of the expansive forces circumferentially of the piston;

Fig. 4 is a detail in section as seen on the line 4—4 of Fig. 3 depicting the expansive pressure equalizer;

Fig. 5 is a detail in horizontal section taken on the line 5—5 of Fig. 1, showing an electrical contact wiper.

Referring to the drawing more specifically, 8 indicates a conventional engine piston reciprocally mounted in a cylinder 9 and carried on a connecting rod 10 leading from a crank 11 on a crank shaft 12; the piston being formed with a series of circumferentially extending ring grooves 13 fitted with expansible split piston rings 14 in a usual fashion.

In carrying out the invention a source of power, constituting a pressure exerting means is carried internally of the piston 8, and means for transmitting outward pressure from said means through the piston side walls to the inner periphery of one or more of the rings 14 are provided. The pressure exerting means is here shown as comprising a pair of magnets 15 and 16, preferably electro-magnets, which are here depicted as carried on the underside of the top wall 17 of the piston and as fitted with oppositely extending aligned cores 18 and 19 the adjacent inner ends of which are fitted with plates 20 and 21 which are spaced apart and have a spring 22′ interposed therebetween.

The side wall of the piston 8 is formed on opposed portions thereof with one or more slots 22 according to the number of the piston rings 14 to be subjected to the action of the expander, two of which rings are here shown as so equipped, and accordingly a pair of such slots 22 are here shown and through each of which slots is extended a pin 23 which leads into the ring groove 13 through the slot 22 and is arranged to transmit pressure from the pressure exerting means to the piston rings 14 in such grooves. The outer ends of the cores 18 and 19 terminate adjacent the outer ends of the pins 23, and where a plurality of the pins 23 are provided adjacent each end of the cores, as here shown, means for equalizing pressures on the pins of each groove is provided, which means is here shown as comprising a rocker equalizing arm 24 seated for oscillatory movement on the outer end of the core and having sockets 25 on the ends thereof in which the outer ends of the pins 23 seat; the rocker arm being here shown as formed with a socket 26 intermediate the ends thereof in which the outer end of the core seats.

Means are provided for distributing pressures imposed on the pins 23 throughout a substantial portion of the inner periphery of a ring which means is here shown as comprising a flexible band 27 which overlies a major of the inner periphery of the ring 14 with its end spaced apart equi-distant on opposite sides of the slit 28 of the piston ring as shown in Fig. 2; the opposed pins 23 being affixed to the band 27 so that outward pressures imposed on the pins 23 will be directed to the band 27 and will tend to expand the latter and at the same time effect expansion of the ring engaged thereby.

Where electro-magnets are employed, as here shown, the coils of a pair of magnets are connected in series with the terminal of one of the magnets grounded while the terminal of the other magnet connects with a conductor bar 29 which extends downwardly from the piston into slidable contact with a wiper contact 30 carried in a bore 31 in a bracket 32 through which the bar 29 extends. A spring 33 bears between the wiper contact member and the bottom of the bore 31 and serves to maintain said contact member in close contact with the bar 29.

Energizing the pair of magnets 15 and 16 is effected by directing electrical current therethrough, as by energizing the bracket 32 from a suitable source of electrical energy as a battery B one terminal of which is connected to the bracket 32 through a conductor 34 to direct current to the magnets through the bar 29. The bracket 32 is insulated from the engine by an insulating plate 35 in a conventional fashion. The magnets 15 and 16 are so arranged that on energization thereof they will exert outward thrusts on the cores 18 and 19 which thrusts will be transmitted through the equalizing arms 24, pins 22 and distributing ribbon 27, to the inner peripheries of the piston rings so as to effect expansion of the latter.

A rheostat 36 is provided in the conductor 34 for varying the degree of the current supplied the magnets 15 and 16 and whereby the force exerted thereby on the piston rings may be regulated and varied at will during operation of the piston as occasion may require.

The spring 22' interposed between the contiguous ends of the cores 18 and 19 serves to exert such outward thrusts on the latter as to maintain the equalizer arms 24 in place and also serves to minimize longitudinal vibration of the cores during operation of the engine.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a piston ring expander, the combination of a piston having a ring groove, a divided ring in said groove, pressure exerting means carried interiorly of said piston, pressure transmission means extending from said pressure exerting means through the piston into contact with the inner periphery of said ring, and regulating means for varying at will the force of said pressure exerting means during operation of the piston.

2. In a piston ring expander, the combination of a piston having a ring groove, a divided ring in said groove, pressure exerting means carried interiorly of said piston, pressure transmission means interposed between said pressure exerting means and said ring including a pressure distributing strap overlying the inner periphery of said ring, and regulating means for varying at will the force of said pressure exerting means during operation of the piston.

3. In a piston ring expander, the combination of a piston formed with a ring groove, an expansible ring in said groove, a magnet assembly carried by said piston interiorly thereof and exerting opposed pressures, means transmitting the pressures from said magnet assembly against the inner periphery of said piston ring to effect expansion thereof, and means for regulating the operation of said magnet assembly for varying the pressure developed thereby.

4. In a piston ring expander, the combination of a piston formed with a ring groove, an expansible ring in said groove, a pair of electromagnets carried interiorly of said piston, movable cores in said magnets, means interposed between said cores and the inner periphery of said ring for expanding the latter under the urge of said magnets, and means operable at a point remote from said piston for controlling the operation of said magnets.

5. In a piston ring expander, the combination of a piston formed with a plurality of ring grooves, a divided expansible ring in each of said grooves, pressure exerting means carried by said piston; pressure transmission means extending from the said pressure exerting means into contact with said rings, means for equalizing the pressure directed to said rings, and regulating means for varying at will the force of said pressure exerting means during operation of the piston.

6. In a piston ring expander, the combination of a piston having a ring groove, an expansible ring in said groove, an electro-magnet carried interiorly of said piston, means interposed between said magnet and the inner periphery of said ring for expanding the latter on energization of said magnet, and means operable during reciprocation of said piston for controlling and varying the ring expansive action of said means.

ANTHONY J. DI LUCCI.